(12) United States Patent
Kim et al.

(10) Patent No.: US 12,220,809 B2
(45) Date of Patent: Feb. 11, 2025

(54) SENSING DEVICE AND ROBOT MANIPULATOR HAVING THE SAME

(71) Applicant: KOREA INSTITUTE OF MACHINERY & MATERIALS, Daejeon (KR)

(72) Inventors: Uikyum Kim, Daejeon (KR); Chanhun Park, Daejeon (KR); Hyunmin Do, Daejeon (KR); Dongil Park, Daejeon (KR); Taeyong Choi, Daejeon (KR); Hwisu Kim, Daejeon (KR); Jongwoo Park, Sejong (KR); Doo-Hyeong Kim, Sejong (KR); Jin-Ho Kyung, Sejong (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 411 days.

(21) Appl. No.: 17/640,388

(22) PCT Filed: Feb. 5, 2020

(86) PCT No.: PCT/KR2020/001673
§ 371 (c)(1),
(2) Date: Mar. 4, 2022

(87) PCT Pub. No.: WO2021/071030
PCT Pub. Date: Apr. 15, 2021

(65) Prior Publication Data
US 2022/0331977 A1 Oct. 20, 2022

(30) Foreign Application Priority Data
Oct. 11, 2019 (KR) ........................ 10-2019-0126391

(51) Int. Cl.
| | | |
|---|---|---|
| *B25J 13/08* | (2006.01) | |
| *B25J 17/00* | (2006.01) | |
| *B25J 19/00* | (2006.01) | |

(52) U.S. Cl.
CPC ............. *B25J 13/085* (2013.01); *B25J 17/00* (2013.01); *B25J 19/0075* (2013.01)

(58) Field of Classification Search
CPC ............ G05B 2219/40599; G05B 2219/40607
See application file for complete search history.

(56) References Cited

U.S. PATENT DOCUMENTS

| | | |
|---|---|---|
| 5,513,106 A | 4/1996 | Yoshino et al. |
| 2017/0312921 A1 | 11/2017 | Kobayashi et al. |

(Continued)

FOREIGN PATENT DOCUMENTS

| | | |
|---|---|---|
| JP | 2018-039086 A | 3/2018 |
| KR | 10-0753557 B1 | 8/2007 |

(Continued)

OTHER PUBLICATIONS

International Search Report issued Jul. 7, 2020, corresponding to International Application No. PCT/KR2020/001673.

*Primary Examiner* — Jaime Figueroa
*Assistant Examiner* — Jerrod Irvin Davis
(74) *Attorney, Agent, or Firm* — Hauptman Ham, LLP (57) ABSTRACT

In a sensing device and a robot manipulator having the sensing device, the sensing device includes a cover, a force sensor and a force information calculating part. The cover has a predetermined shape and is configured to cover a body. The force sensor is disposed at a position between the body and the cover, and is configured to measure a force and a torque applied via the cover at the position. The force information calculating part is configured to obtain an information on the force applied to the cover from data (Continued)

measured by the force sensor, when the force is applied to an arbitrary position of the cover.

17 Claims, 5 Drawing Sheets

(56) References Cited

U.S. PATENT DOCUMENTS

| | | | |
|---|---|---|---|
| 2018/0065256 A1* | 3/2018 | Naitou | F16P 3/12 |
| 2018/0079090 A1* | 3/2018 | Koenig | G01L 3/14 |
| 2019/0248030 A1* | 8/2019 | Matsuda | B25J 13/081 |
| 2021/0197381 A1* | 7/2021 | Bordegnoni | B66F 9/063 |
| 2022/0203563 A1* | 6/2022 | Wuensch | B25J 9/1674 |

FOREIGN PATENT DOCUMENTS

| | | |
|---|---|---|
| KR | 10-2016-0146979 A | 12/2016 |
| KR | 10-2019-0120838 A | 10/2019 |

* cited by examiner

SENSING DEVICE AND ROBOT MANIPULATOR HAVING THE SAME

CROSS-REFERENCE TO RELATED APPLICATION

The present application is a national stage filing under 35 U.S.C. § 371 of PCT application number PCT/KR2020/001673 filed on Feb. 5, 2020, which is based upon and claims the benefit of priorities to Korean Patent Application No. 10-2019-1026391 filed on Oct. 11, 2019, in the Korean Intellectual Property Office, which are incorporated herein in their entireties by reference.

BACKGROUND

1. Field of Disclosure

The present disclosure of invention relates to a sensing device and a robot manipulator having the sensing device, and more specifically the present disclosure of invention relates to a sensing device and a robot manipulator having the sensing device, capable of detecting magnitude, a direction and a position of a force for entire area of a cover, using a single force sensor measuring the force and a torque.

2. Description of Related Technology

Generally, a robot manipulator is widely used in an industrial field such as a vehicle manufacturing factory, a semiconductor manufacturing factory and so on, and the robot manipulator includes multiple joints and a tool equipped at an end, for performing a predetermined process. Thus, the efficiency of the process may be increased and the process at an extreme environment may be easily performed, by the robot manipulator.

In the operation of the robot manipulator, the safety in the process is the most important issue. Thus, conventionally, a sensor is attached to the robot manipulator and a force applied to the robot manipulator is measured, so that the operation of the robot manipulator may be controlled safely.

Figure 1:
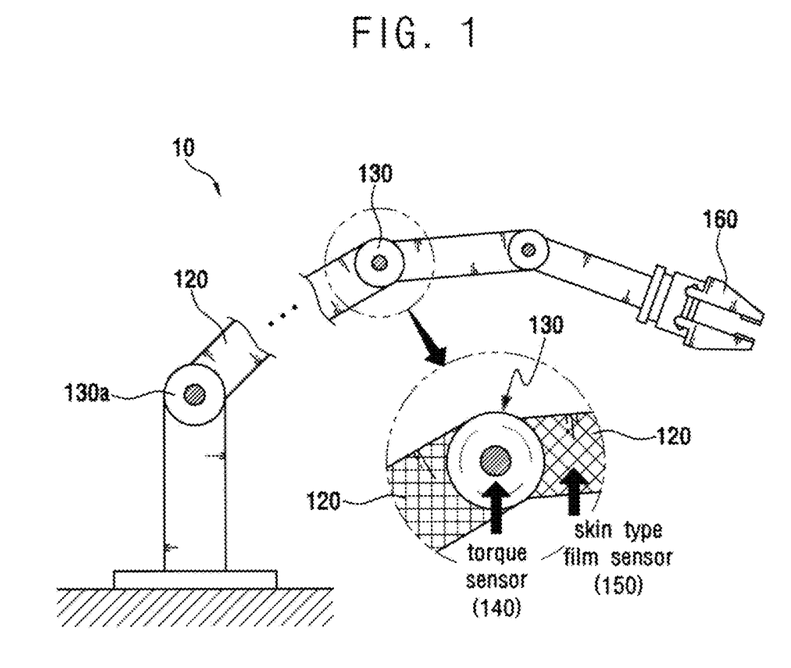
FIG. 1 is a schematic view illustrating a conventional robot manipulator having a sensing system configured to measure an external force.

FIG. 1 is a schematic view illustrating a conventional robot manipulator having a sensing system configured to measure an external force.

In the conventional robot manipulator, the sensing methods for measuring the force applied to a joint link 120 are as follows in two ways.

As a first method, a torque sensor 140 is equipped to a joint 130 between the joint links 120 adjacent to each other, to measure a force applied to the joint link 120. Here, the torque sensor 140 is equipped to each joint 130, and thus an impact of the robot manipulator 10 may be detected and the external force applied to the robot manipulator 10 may be measured.

However, the above method, There are no ways to measure where external forces (or impacts) are acting, thus it is impossible to estimate real magnitude and direction of external forces (or impact) from the remote sensing at joint 130. In addition, the torque sensor 140 should be linearly equipped to an actuator (not shown) formed at the joint 130, and thus a joint module should be designed complicatedly and cost may be increased. Further, a relatively small error occurring in the torque sensor 140 of a start joint 130$a$ makes a relatively large error at an end due to error accumulation. Here, to minimize the error accumulation, a relatively expensive torque sensor having fine accuracy and high stiffness should be used.

As a second method, a skin type film sensor 150 covering each joint link 120 is used. A flexible skin type film sensor 150 is attached to a surface of the joint link 120, and thus magnitude, a position and a distribution of the force applied to the joint link 120 may be measured. However directions of the force applied to the joint can not be measured with this method.

In using the above skin type film sensor 150, both the magnitude of the force and the position and the distribution of the force are obtained at the same time and the film sensor 150 may be useful. However, in the skin type film sensor 150, a plurality of sensor nodes are arranged over an entire surface of the film sensor, and thus the number of the sensor nodes are increased and a wiring is complicated. In addition, since many sensor nodes are necessary, a high sensitive and expensive sensor is hard to be used, so that reliability of the sensing results may be decreased.

Related prior art is Korean laid-open patent No. 10-2016-0146979.

SUMMARY

The present invention is developed to solve the above-mentioned problems of the related arts. The present invention provides a sensing device capable of detecting magnitude, a direction and a position of a force applied to an arbitrary position of a cover, using a single force sensor which measures the force and a torque and is disposed at a position of an entire surface between a body of various kinds of structures and the cover covering the body.

In addition, the present invention also provides a robot manipulator having the sensing device.

According to an example embodiment, a sensing device includes a cover, a force sensor and a force information calculating part. The cover has a predetermined shape and is configured to cover a body. Robot can use multiple number of the present invention to cover whole robot areas. The force sensor is disposed at a position between the body and the cover, and is configured to measure a force and a torque applied via the cover at the position. The force information calculating part is configured to obtain an information on the force applied to the cover from data measured by the force sensor, when the force is applied to an arbitrary position of the cover.

In an example, the force information calculating part may be configured to obtain the information of the force applied to the cover, by using an information on the predetermined shape of the cover in addition to the data measured by the force sensor.

In an example, in the cover, the arbitrary position of the cover may be defined by a predetermined expression with respect to the position at which the force sensor is disposed.

In an example, the force (f) and the torque (q) measured by the force sensor may have a geometric locational relation with the applied force (p) and the position (c) of the cover at which the force is applied.

In an example, the cover may have a rigid material, and the cover may have the predetermined shape such as a plane shape, a partial cylindrical shape, a partial spherical shape and a curved shape.

In an example, the body may be one of a robot, a mobile device, a game device, a display and a smart device.

In an example, the force sensor may be disposed at each cover.

According to another example embodiment, a robot manipulator includes a cover, a force sensor and a force information calculating part. The cover has a predetermined shape and is configured to cover a body of a robot. The force sensor is disposed at a position between the body and the cover, and is configured to measure a force and a torque. The force information calculating part is configured to obtain an information on the force applied to an arbitrary position of the cover from data measured by the force sensor and an information on the shape of the cover.

In an example, the force sensor may be a 6-axis force sensor measuring forces and torques along three directions perpendicular to one another.

In an example, the body may be formed with a plurality of joint links.

In an example, the cover may be divided into a plural to cover the joint link, and the force sensor may be disposed at each divided cover.

In an example, the cover may be divided into the plural along an axis circumferential direction of the joint link.

In an example, a plane surface may be formed in an inner surface of the cover to form a contact portion making contact with a horizontal surface of the force sensor.

In an example, the information of the force may include at least one of magnitude of the force, a direction of the force and a position of the force.

In an example, the cover may have a rigid material, and the force sensor may be disposed at each cover.

In an example, the robot manipulator may further include a joint link configured to form a robot joint, a joint disposed between the joint links adjacent to each other, and an end effector formed at an end of the joint link. Here, the body may be the joint link.

According to the present example embodiments, the force applied to the arbitrary position on the cover may be easily and effectively detected by the single force sensor which is disposed at a position of an entire surface between the cover and the body of the structure such as the robot.

In addition, the direction of the force applied to the cover may be also measured in addition to the magnitude and position of the force.

In addition, compared to the skin type film sensor, the number of the wiring is decreased and thus the wiring may be easily formed and arranged.

In addition, the torque sensor is unnecessary to be equipped at the joint, the structure of the joint may be more simplified.

In addition, the sensing device may be easily manufactured by using the cover having the rigid material conventionally used for protecting an inside of the structure such as the robot.

| * Reference numerals | |
|---|---|
| 100: robot manipulator | 110: base |
| 120: joint link | 122: cover |
| 123: contact portion | 130: joint |
| 140: torque sensor | 150: skin type film sensor |
| 160: end effector | 170: force sensor |

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The invention is described more fully hereinafter with reference to the accompanying drawings, in which embodiments of the invention are shown.

Figure 2:
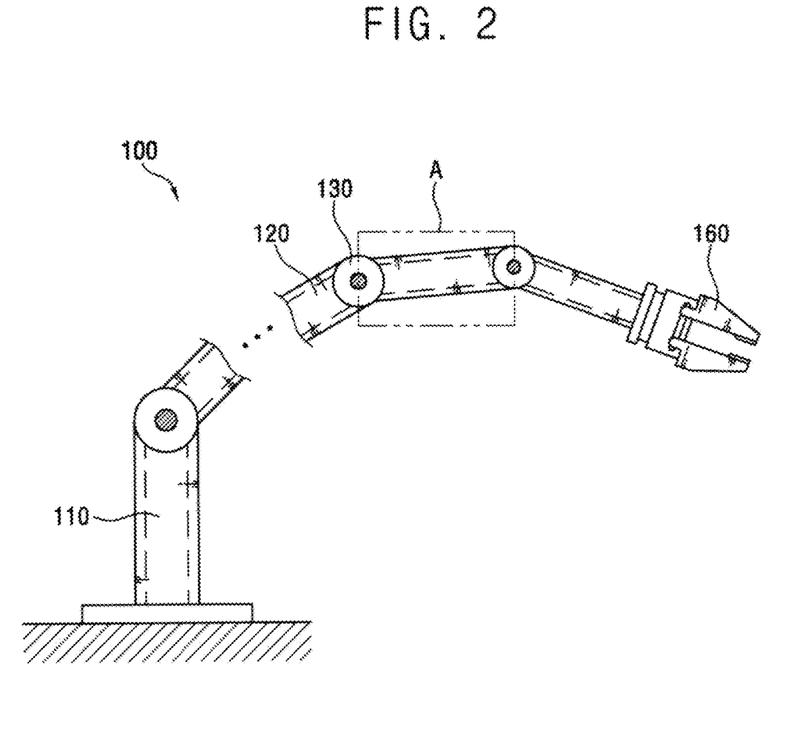
FIG. 2 is a schematic view illustrating a robot manipulator having a sensing device according to an example embodiment of the present invention.
Figure 3:
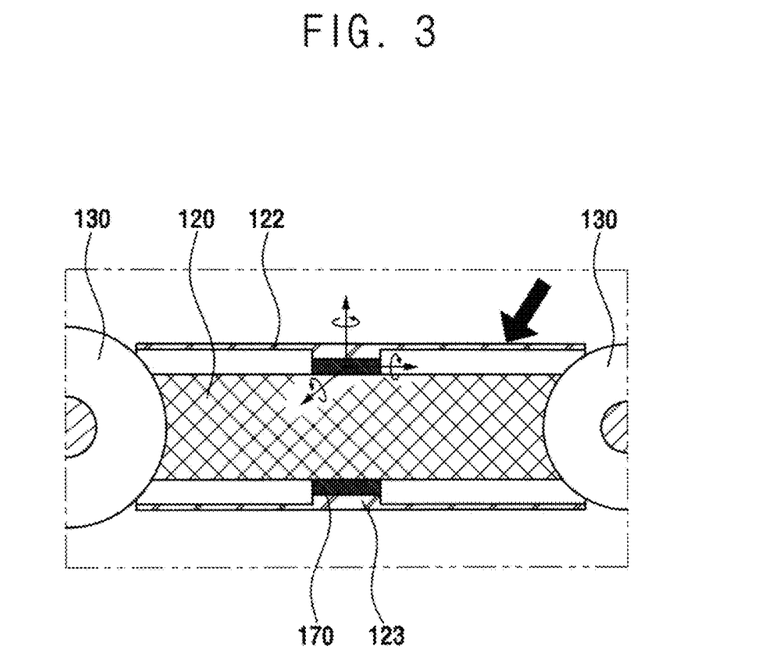
FIG. 3 is a cross-sectional view showing a portion 'A' of FIG. 2.
Figure 4A:
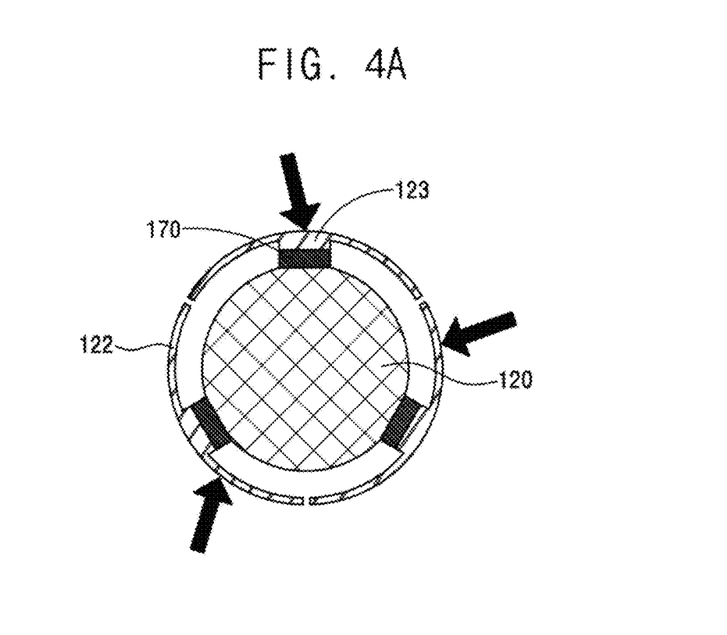
FIG. 4A and FIG. 4B are cross-sectional views illustrating a joint link.
Figure 4B:
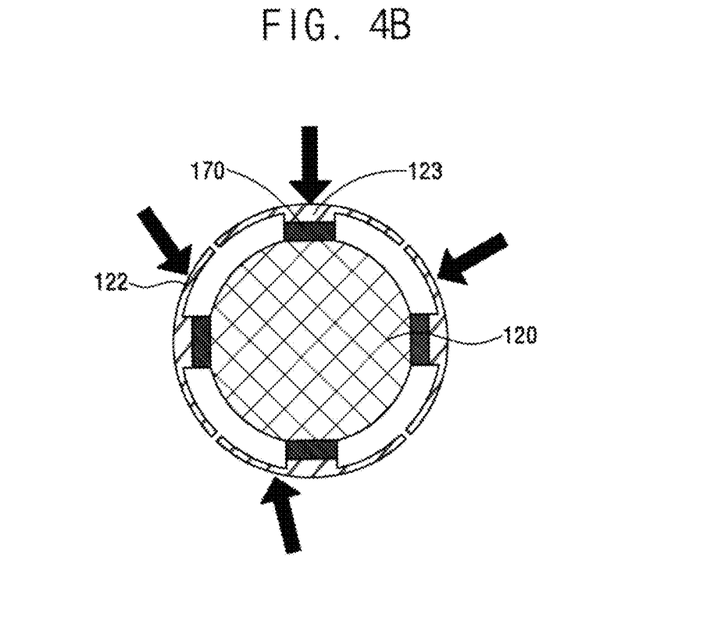

FIG. 2 is a schematic view illustrating a robot manipulator having a sensing device according to an example embodiment of the present invention. FIG. 3 is a cross-sectional view showing a portion 'A' of FIG. 2. FIG. 4A and FIG. 4B are cross-sectional views illustrating a joint link.

Referring to FIG. 2, FIG. 3, FIG. 4A and FIG. 4B, the sensing device according to the present example embodiment includes a cover 122, a force sensor 170 and a force information calculating part (not shown).

In the present example embodiment, the sensing device may be equipped to an outer shape of a structure such as a robot having a predetermined body, and may be further equipped to the outer shape of various kinds of structures, and the structure is not limited to a robot manipulator explained below.

However, for the convenience of the explanation, the sensing device is explained to be equipped to the robot, and the robot manipulator 100 is explained as a representative example to which the sensing device is equipped.

Thus, the robot manipulator 100 may include the cover 122, the force sensor 170 and the force information calculating part (not shown).

Here, as illustrated in FIG. 2, the robot manipulator 100 includes a joint link 120, a joint 130 and an end effector 160 which are included in the conventional robot manipulator, and the above conventional components, the robot manipulator 100 according to the present example embodiment further includes the cover 122, the force sensor 170 and the force information calculating part.

The joint link 120 is a plural, and the plurality of joint links 120 is serially connected from a base 110 forming a fixing portion, to form a robot joint similar with a human joint. Here, the joint 130 is formed between the base 110 and the joint link 120 or between the joint links 120 adjacent to each other, and an actuator (not shown) is formed at the joint 130 to perform various kinds of actions. For example, according to the design of the actuator, the joint link 120 may be rotated with respect to the joint 130, may be rotated with respect to an axis of the joint link 120, or may be linearly driven using a cylindrical type actuator. Thus, various kinds of robot manipulators 100 having multiple degrees of freedom may be manufactured by applying various kinds of designing methods such as the change of the number of the joint links 120, the change of the design of the actuator at the joint, and so on.

The end effector 160 is formed at an end of the endmost joint link 120, and various kinds of end effectors 160 may be equipped considering required functions such as gripping, welding, assembling, and so on.

The cover 122 covers an outer surface of the joint link 120. Here, a predetermined separation space is formed between the joint link 120 and the cover 122, and the force sensor 170 may be disposed in the separation space.

Here, a plurality of the covers 122 which is separated with each other may cover an entire outer surface of the joint link 120, and each force sensor 170 may be disposed in each separation space formed between the joint link 120 and each of the covers 122. That is, the cover 122 covering the outer surface of each joint link 120 may be divided into a plural. The plurality of the covers 122 separated with each other covers the outer surface of the single joint link 120, as illustrated in FIG. 4A. For example, the plurality of covers 122 may cover the entire surface of the joint link 120 along an axis circumferential direction of the joint link 120. In FIG. 4A, three covers 122 spaced with each other by 120° are disposed along the axis circumferential direction of the joint link 120, for covering the joint link 120. In FIG. 4B, four covers 122 spaced with each other by 90° are disposed along the axis circumferential direction of the joint link 120, for covering the joint link 120. The method for covering the single joint link 120 using the plurality of covers 122 may not be limited to the above mentioned methods, and may be variously changed. Further, the number of the covers 122 is not limited thereto, the shape of each of the covers 122 may be changed variously, and the distance between the covers 122 may also be changed variously. However, for the convenience of the manufacturing, the number of the divided covers may be properly controlled.

Here, the divided covers 122 adjacent to each other for the single joint link 120 may be separated with each other and may not be interfered. As illustrated in FIG. 4A and FIG. 4B, a single force sensor 170 is disposed between the divided cover 122 and the joint link 120, and each force sensor 170 measures the force applied to each cover 122 making contact with each force sensor 170. Thus, the specific force sensor 170 measuring the force applied to the specific cover 122 is not affected by the force applied to other cover 122.

The cover 122 covers the joint link 120 disposed inside of the cover 122, a power transmission (not shown), an electric circuit (not shown), a wiring (not shown) and so on, and also covers the outer surface. Thus, the outer surface of the device may look clean and neat.

The cover 122 covers the joint link 120 in addition to the wiring as mentioned above, and the cover 122 transmits the force applied at an arbitrary position of the cover 122 to the force sensor 170. Thus, the cover 122 may include a rigid material.

Here, the cover 122 has a predetermined shape, which means that the shape of the cover 122 is not changed or the shape of the cover 122 is restored to an original shape once changed.

In addition, since the cover 122 has the predetermined shape, the arbitrary position of the cover 122 may be defined as a predetermined expression with respect to a specific reference point or position.

Here, when the specific reference position is defined as the position at which the force sensor 170 is disposed, the arbitrary position of the cover 122 may be defined as the predetermined expression with respect to the position at which the force sensor 170 is disposed.

The expression may include various kinds of geometrical functions and may be defined variously according to the shape of the cover 122. For example, as the cover 122 has a plane shape extending along a direction, the expression may be a plane function defining the extending plane of the cover 122.

Accordingly, with the cover 122 maintaining an initial shape, an arbitrary position of the cover 122 may be defined as a predetermined geometrical function, with respect to a predetermined defined reference position of the cover.

As for the shape of the cover 122, the cover 122 may have a plane shape, a partial cylindrical shape, a partial spherical shape, a curved shape and so on.

The force sensor 170 is disposed at an arbitrary position of an entire surface between the joint link 120 and the cover 122 covering the joint link 120, to measure a force and a moment transmitted from the cover 122. Here, single force sensor 170 may be disposed at the arbitrary position mentioned above. In the present example embodiment, the force sensor 170 is disposed between an upper portion of the joint link 120 and a lower portion of the cover 122, and the single force sensor 170 is disposed at the position of the entire surface between the joint link 120 and the cover 122. Here, a skin type film sensor disposed all over the entire surface of the joint link 120 is not used in the present example embodiment. Further, the force sensor 170 may be disposed at a center of the cover 122.

When the force is applied to the arbitrary position of the cover 122, the force sensor 170 measures the force and the moment transmitted to the cover 122 which has a rigid material. As explained below, the force information calculating part calculates a force information including magnitude, a direction and a position of the force actually applied to the cover 122, based on the force and the moment measured by the force sensor 170.

As illustrated in FIG. 3, FIG. 4A and FIG. 4B, a contact portion 123 is formed at the cover 122, so that the cover 122 may contact with an upper horizontal surface of the force sensor 170 easily. Here, the contact portion 123 forms a plane surface on an inner surface of the cover 122 having a curved surface.

In the present example embodiment, the force sensor 170 measures the force and the moment at the same time, and thus the force sensor 170 may be a multi-axis force sensor having three axes or six axes. For example, the force sensor 170 may be the six-axis force sensor measuring a three-axis direction force ($f_x$, $f_y$, $f_z$) and a three-axis direction torque ($m_x$, $m_y$, $m_z$).

The six-axis force sensor 170 disposed between the cover 122 and the joint link 120 measures the three-axis direction force and the three-axis direction torque applied to the force sensor 170, as the force is applied to the arbitrary position of the cover 122 due to an external impact and so on.

The force information calculating part (not shown) calculates the magnitude, the direction and the position of the force applied to the cover 122, based on the force and the torque measured by the force sensor 170. Here, when the geometrical information on the shape of the cover 122 is obtained, the geometrical relation between the six-axis values mentioned above measured by the force sensor 170 and the force applied to the surface of the cover 122 may be obtained. Thus, as the force is applied to the arbitrary position of the cover 122, the force information calculating part may obtain or calculate the magnitude, the direction, and the position of the force applied to the cover 122 fast and accurately, using the forces and torques measured by the force sensor 170 and the geometrical shape of the cover 122.

In the present example embodiment, the six-axis data are measured by the six-axis force sensor 170 and the geometrical shape of the cover 122 is obtained, and then the magnitude, the direction and the position of the force applied to the cover 122 is easily obtained. Here, the number of the information on the force applied to the cover 122 may change as the number of the data measured by the force sensor 170 changes.

The force information calculating part may include a memory storing the data and a calculating part like a CPU calculating the data.

Based on the force information calculated by the force information calculating part, the robot manipulator 100 may be operated by a controller (not shown). For example, the magnitude of the force applied to the cover 122 is larger than a predetermined value, the controller may control the robot manipulator 110 to be automatically stopped or to move along alternative path.

Here, as explained above referring to FIG. 4A and FIG. 4B, the cover 122 covering the joint link 120 is divided into a plural spaced apart from each other, and the force sensor 170 is disposed between each divided cover 122 and the joint link 120. As the number of the divided covers increases, the information of the force applied to the joint link 120 may be obtained more accurately.

Hereinafter, a calculating process of obtaining the force information applied to the cover 122, based on the force and the torque measured by the force sensor 170 and the geometrical shape of the cover, in the force information calculating part, is explained.

Figure 5:
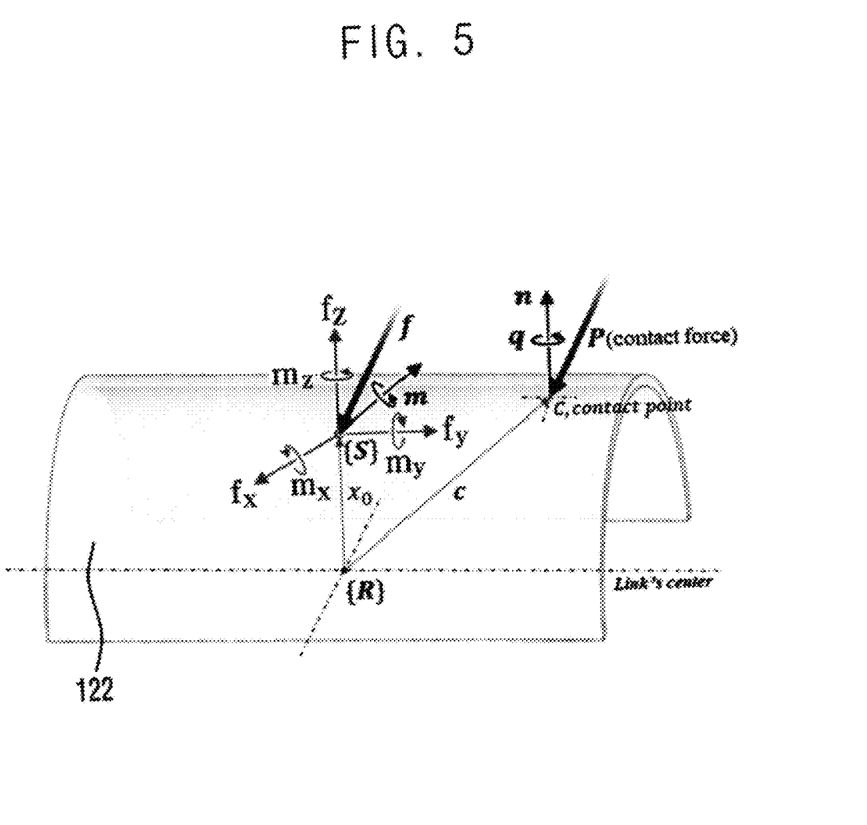
FIG. 5 is a schematic view illustrating a directional relation and a position relation between a force measured by a force sensor disposed under a cover and a force actually applied to the cover.

FIG. 5 is a schematic view illustrating a directional relation and a position relation between a force measured by a force sensor disposed under a cover and a force applied to the cover.

A surface S in FIG. 5 has a cylindrical shape having a radius $r_0$ and an axis parallel with a y axis. The force sensor 170 is located at the coordinates of $x_0=(0,0,z_0)$, and here, $0<z_0<r_0$. The surface S is expressed as Expression (1) by a zero set of quadratic form.

$$S(r) = r^T A^T A r - r_0^2 = 0 \quad \text{Expression (1)}$$

Here, 'A' is expressed as Expression (2)

$$A = \begin{pmatrix} 1/\gamma & 0 & 0 \\ 0 & 1 & 0 \\ 0 & 0 & 1 \end{pmatrix} \quad \text{Expression (2)}$$

In Expression (2), to express the geometrical shape of the cylindrical surface, $\gamma$ has a limiting value as $\infty$.

As illustrated in FIG. 5, the force f measured by the force sensor 170 is expressed as a three-axis contact force p. In addition, the moment m measured by the force sensor 170 is related to the torque q, the contact position c, and the three-axis contact force p. Here, the force f and the torque q measured by the force sensor 170 have a geometrical locational relation among the applied force p and the position c of the cover to which the force is applied. Thus, the force-moment equilibrium equations are expressed by Expression (3) and Expression (4).

$$f=p \quad \text{Expression (3)}$$

$$m=q+(c-x_0)\times p \quad \text{Expression (4)}$$

Here, $m'=m+x_0\times f$, the force-moment equilibrium equation is expressed by Expression (4), as expressed as a sum of quantities.

$$m'=q+c\times p \quad \text{Expression (5)}$$

A normal vector n of the surface is expressed by Expression (6).

$$n = \frac{\nabla L_\gamma(c)}{\|\nabla L_\gamma(c)\|} = \frac{A^2 c}{\|A^2 c\|} \quad \text{Expression (6)}$$

q is parallel with a normal vector of S, and thus a variable K exists as Expression (7).

$$q=KA^2c \quad \text{Expression (7)}$$

From Expression (3), Expression (5) and Expression (7), Expression (8) is obtained.

$$m'=KA^2c+c\times f \quad \text{Expression (8)}$$

From Expressions (1) to (8), a system having four nonlinear equations and four unknown values is expressed as followed.

$$\Gamma(K)c=m' \quad \text{Expression (9)}$$

$$c^T A^2 c = r_0^2 \quad \text{Expression (10)}$$

Here, the 3×3 matrix $\Gamma(K)$ is defined as Expression (11).

$$\Gamma(K) = \begin{pmatrix} K/\gamma & f_3 & -f_2 \\ -f_3 & K & f_1 \\ f_2 & -f_1 & K \end{pmatrix} \quad \text{Expression (11)}$$

Using Expression (9) and Expression (10), the variables c and K are obtained, and following two cases are considered.

First, if $f^T m'=0$, c is obtained in the force system via the wrench-axis method. This is the solution of a point contact with the condition of q=0. Here, the variable c is obtained by Expression (12).

$$c=r_0+\lambda f \quad \text{Expression (12)}$$

Here, the axis is a line passing through $r_0$, and is expressed by Expression (13) and Expression (14).

$$r_0 = \frac{f \times m}{\|f\|^2} \quad \text{Expression (13)}$$

$$\lambda = \frac{-f' \cdot r_0' - \sqrt{(f' \cdot r_0')^2 - |f'|^2(\|r_0'\|^2 - R^2)}}{|f|^2}. \quad \text{Expression (14)}$$

Here, $f'=Af$ and $r'_0=Ar_0$. f which is parameterized by $\lambda$ is parallel with the axis.

Second, if $f^T m' \neq 0$, a soft contact solution in which the moment q is applied on the surface is obtained. Here, the variable c is expressed as Expression (15).

$$c = \frac{1}{\det\Gamma(K)}\left[K^2 D^2 A^{-2} m' + K(A^2 f)\times m' + (f^T m')f\right] \quad \text{Expression (15)}$$

Here, K is obtained from Expression (16).

$$K_4 D_2 r_0^2 + K^2[r_0^2\|Af\|^2 - D^2\|A^{-1}m'\|^2] - (f^T m')^2 = 0. \quad \text{Expression (16)}$$

In the above Expressions, Expression (17) is referred.

$$D=\det(A), \sigma D^2 \|A^{-1}m'\|^2 - R^2 \|Af\|^2 \quad \text{Expression (17)}$$

In Expression (15), $\gamma \to \infty$ is applied, the contact position at which the force is applied on the surface of the cylindrical shape is obtained. Thus, the limit of D is calculated as Expression (18).

$$\lim_{\gamma \to \infty} D = \lim_{\gamma \to \infty} \frac{1}{\gamma} = 0 \quad \text{Expression (18)}$$

Similarly, Expression (10) is calculated.

$$\lim_{\gamma \to \infty} D^2 |A^{-1}m'|^2 = \lim_{\gamma \to \infty} \gamma^{-2}(\gamma m'_1 + m'_2 + m'_3)^2 \quad \text{Expression (19)}$$
$$= (m'_1)^2$$

Thus, the limit of $\sigma$ is expressed as Expression (20), due to the definition of $\sigma$.

$$\lim_{\gamma \to \infty} \sigma = (m'_1)^2 - r_0^2(f_2^2 + f_3^2) \quad \text{Expression (20)}$$

The variable K is obtained at the case when $\gamma \to \infty$. Expression (16) is expressed as Expression (21), since $D \to 0$.

$$K^2 \sigma - (f^T m')^2 = 0 \quad \text{Expression (21)}$$

Thus, $$\lim_{\gamma \to \infty} K = -\frac{f^T m'}{\sqrt{-\sigma}} = \frac{-f^T m'}{\sqrt{r_0^2(f_2^2 + f_3^2) - (m'_1)^2}} \quad \text{Expression (22)}$$

Expression (22) is obtained.

Finally, the variable c is obtained as Expression (23), due to the limits of D, $\sigma$ and K.

$$\lim_{\gamma \to \infty} c = \frac{1}{\det \Gamma} \left[ K^2 D^2 A^{-2} m' + K(A^2 f) \times m' + (f^T m') f \right] \quad \text{Expression (23)}$$
$$= \frac{1}{K(f_2^2 + f_3^2)} \left[ K^2(m'_1, 0, 0) + K(0, f_2, f_3) \times m' + (f^T m') f \right].$$

Finally, as the results explained above, the geometrical relationship is defined, and the three-axis external force p and the contact positon c of the surface are expressed by the force f and m measured by the force sensor 170. Accordingly, from the geometrical shape of the cover 122 and the measured data of the force and the torque by the force sensor 170, the force information including the magnitude, the direction and the position of the force actually applied to the cover 122 is obtained.

According to the present example embodiment, the robot manipulator 100 having the sensing device is explained, but as mentioned above, the sensing device may be configured to various kinds of structures except for the robot manipulator.

The cover 122 is disposed to cover the body of the robot, and further may be disposed or equipped to various kinds of structures such as a robot body, a mobile device, a game device, a display like a television, a smart device and so on.

When various kinds of structures equipped to the cover 122 are the structures in which the operation is inputted by a user's touch, as explained above, the force information at the position where the user touches is easily obtained by the sensing device. Thus, using the sensing device having a relatively simple structure as explained above, the information on the user's touch may be easily obtained in the various kinds of structures.

Hereinafter, the operation of the robot manipulator according to the present example embodiment is explained.

The robot manipulator includes a first joint 130 between the base 110 and the joint link 120, and the controller (not shown) controls the actuator (not shown) equipped to the joint 130 disposed between the joint links 120 adjacent to each other, so that the robot manipulator performs joint movements and the end effector 160 connected to the end joint link 120 performs an operation of gripping the object, welding, assembling and so on.

Here, when the external force due to the impact is applied to the cover 122 covering the outer surface of the joint link 120, the force sensor 170 disposed at the position between the cover 122 and the joint link 120 measures the force and the torque transmitted from the cover 122 having the rigid material. Here, the force sensor 170 is the six-axis force sensor 170 measuring the three-axis force and the three-axis torque, and thus the force information calculating part (not shown) obtains the information on the magnitude, the direction and the position of the force applied to the arbitrary position of the cover 122 using the measured data from the force sensor 170 and the geometrical shape of the cover 122.

Here, the relation equation matching the relationship between the geometrical shape of the cover 122 and the force applied to the surface of the cover 122 from the measured data from the force sensor 170, is used, to obtain the magnitude, the direction and the position of the force applied to the cover 122 fast and accurately.

In addition, based on the force applied to the cover 122 which is obtained from the force information calculating part, the controller controls the operation of the robot manipulator 100.

In the present example embodiment, the robot manipulator having a plurality of joint links 120 is explained as an example, but the example mentioned above may be applied to any of normal robot bodies forming an outer shape of the robot having the joint link 120.

According to the present example embodiments, the force applied to the arbitrary position on the cover may be easily and effectively detected by the single force sensor which is disposed at a position of an entire surface between the cover and the body of the structure such as the robot.

In addition, the direction of the force applied to the cover may be also measured in addition to the magnitude and position of the force.

In addition, compared to the skin type film sensor, the number of the wiring is decreased and thus the wiring may be easily formed and arranged.

In addition, the torque sensor is unnecessary to be equipped at the joint, the structure of the joint may be more simplified.

In addition, the sensing device may be easily manufactured by using the cover having the rigid material conventionally used for protecting an inside of the structure such as the robot.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A sensing device comprising:
a cover having a predetermined shape and configured to cover a body;
a force sensor disposed at a position between the body and the cover, and configured to measure a force and a torque applied via the cover at the position; and
a force information calculating part configured to obtain an information on the force applied to the cover from data measured by the force sensor, when the force is applied to an arbitrary position of the cover,
wherein the force information calculating part is configured to obtain the information of the force applied to the cover, by using an information on the predetermined shape of the cover in addition to the data measured by the force sensor.

2. The sensing device of claim 1, wherein in the cover, the arbitrary position of the cover is defined by a predetermined expression with respect to the position at which the force sensor is disposed.

3. The sensing device of claim 2, wherein the force (f) and the torque (q) measured by the force sensor has a geometric locational relation with the applied force (p) and the position (c) of the cover at which the force is applied.

4. The sensing device of claim 2, wherein
the predetermined expression corresponds to the predetermined shape of the cover.

5. The sensing device of claim 4, wherein
the predetermined shape of the cover is a plane shape, and the predetermined expression is a plane function defining an extending plane of the cover.

6. The sensing device of claim 1, wherein the cover has a rigid material, and the predetermined shape of the cover includes a plane shape, a partial cylindrical shape, a partial spherical shape, or a curved shape.

7. The sensing device of claim 1, wherein the body is one of a robot, a mobile device, a game device, a display, or a smart device.

8. The sensing device of claim 1, wherein the force sensor is disposed at each cover.

9. A robot manipulator comprising:
a cover having a predetermined shape and configured to cover a body of a robot;
a force sensor disposed at a position between the body and the cover, and configured to measure a force and a torque; and
a force information calculating part configured to obtain an information on the force applied to an arbitrary position of the cover from data measured by the force sensor and an information on the shape of the cover.

10. The robot manipulator of claim 9, wherein the force sensor is a 6-axis force sensor configured for measuring forces and torques along three directions perpendicular to one another.

11. The robot manipulator of claim 9, wherein the body is formed with a plurality of joint links.

12. The robot manipulator of claim 11, wherein the cover is divided into a plural to cover the joint link, and the force sensor is disposed at each divided cover.

13. The robot manipulator of claim 12, wherein the cover is divided into the plural along an axis circumferential direction of the joint link.

14. The robot manipulator of claim 9, wherein a plane surface is formed in an inner surface of the cover to form a contact portion making contact with a horizontal surface of the force sensor.

15. The robot manipulator of claim 9, wherein the information of the force comprises at least one of magnitude of the force, a direction of the force, or a position of the force.

16. The robot manipulator of claim 9, wherein the cover has a rigid material, and the force sensor is disposed at each cover.

17. The robot manipulator of claim 9, further comprising:
a joint link configured to form a robot joint;
a joint disposed between the joint links adjacent to each other; and
an end effector formed at an end of the joint link,
wherein the body is the joint link.

* * * * *